United States Patent
Strogov et al.

(10) Patent No.: US 12,430,435 B2
(45) Date of Patent: Sep. 30, 2025

(54) SHADOW BACKUP AND ANTI-MALWARE PROTECTION FOR UNIX-BASED MACHINES

(71) Applicant: Acronis International GmbH, Schaffhausen (CH)

(72) Inventors: Vladimir Strogov, Singapore (SG); Serg Bell, Singapore (SG); Aliaksei Dodz, Singapore (SG); Denis Kopyrin, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 273 days.

(21) Appl. No.: 18/193,377

(22) Filed: Mar. 30, 2023

(65) Prior Publication Data
US 2024/0330458 A1 Oct. 3, 2024

(51) Int. Cl.
*G06F 21/56* (2013.01)
*G06F 11/14* (2006.01)

(52) U.S. Cl.
CPC ........ *G06F 21/566* (2013.01); *G06F 11/1451* (2013.01)

(58) Field of Classification Search
CPC . G06F 11/1451; G06F 11/1453; G06F 21/566
See application file for complete search history.

(56) References Cited

U.S. PATENT DOCUMENTS

| | | | |
|---|---|---|---|
| 7,827,349 B1* | 11/2010 | Fair | G06F 3/0611 711/112 |
| 8,856,927 B1* | 10/2014 | Beloussov | G06F 21/568 726/23 |
| 9,128,973 B1* | 9/2015 | Murugesan | G06F 11/1458 |
| 9,959,278 B1* | 5/2018 | Khanduja | G06F 16/128 |
| 10,678,652 B1* | 6/2020 | Rangapuram | G06F 16/148 |
| 10,678,758 B2 | 6/2020 | Dornemann | |
| 10,713,361 B2 | 7/2020 | Strogov et al. | |
| 10,877,750 B1* | 12/2020 | Connolly | H04L 9/0897 |
| 11,321,188 B2 | 5/2022 | Mitkar et al. | |
| 11,531,648 B2 | 12/2022 | Smith et al. | |
| 11,977,479 B2* | 5/2024 | Zilberstein | G06F 12/0223 |
| 12,026,137 B1* | 7/2024 | Sethi | G06F 16/215 |
| 2018/0157834 A1 | 6/2018 | Continella et al. | |
| 2018/0307839 A1* | 10/2018 | Bhave | G06F 21/552 |
| 2018/0365145 A1* | 12/2018 | Jibbe | G06F 12/10 |
| 2020/0050687 A1* | 2/2020 | Kaushik | G06F 11/2097 |
| 2021/0382992 A1* | 12/2021 | Massiglia | G06F 21/64 |

* cited by examiner

*Primary Examiner* — Jonathan A Bui
(74) *Attorney, Agent, or Firm* — ESPE Legal Consultancy EZ-LLC (57) ABSTRACT

Systems and methods for embedding into a storage stack of a UNIX based computing device. A method includes building a file storage map for a file stored in computing device data storage, intercepting a system call associated with the file, intercepting a storage stack operation, and analyzing the system call and the storage stack operation using the file storage map to determine a change to a data block of the file. The method further includes building a shadow copy of the file on backup storage. The method further includes detecting a malicious operation based on the change to the data block.

20 Claims, 9 Drawing Sheets

SHADOW BACKUP AND ANTI-MALWARE PROTECTION FOR UNIX-BASED MACHINES

TECHNICAL FIELD

Embodiments relate generally to data security. More particularly, embodiments relate to systems and methods for ensuring data security in the modification or deletion of computer system files1.

BACKGROUND

Typically, when saving data on a computer system disk, a storage stack is utilized. A storage stack typically includes a file system, device drivers, and an input/output (I/O) request handler. Data, for example in the form of a file, can be stored on disk space in different blocks, which are not always next to each other, but are typically within the same volume.

When editing stored data, for example, deleting a file at the operating system level, the data blocks that store information from the file may not actually be changed, but are rather marked as free at the file system level. Freed blocks typically remain unchanged until they are replaced by another file or new data from the same file. As computing devices operate on many files over time and particularly, on many files in serial or in parallel, many changes are made to files at the operating system level, which significantly increases the cost of tracking all change operations. Tracking change operations is critical in data backup as well as in identifying malicious threats.

In WINDOWS systems, data filters and protection components can be built into the storage stack. However, such an implementation cannot be utilized in LINUX systems. The storage stack in LINUX systems is different from WINDOWS and requires a different approach compared to Windows.

Therefore, there is a need for data backup and anti-malware protection configured for any type of computer system that provides minimal impact on the resources of the protected computer system. There is a related need in easily identifying a file that has been moved or copied to another volume within the computer system.

SUMMARY

Embodiments described herein or otherwise contemplated herein substantially meet the aforementioned needs of the industry. Systems and methods ensure data security in modification or deletion of computer system files using a shadow backup of data blocks on a computer system disk.

Embodiments described herein include systems and methods for embedding with operating system blocks. For example, a parallel I/O and read/write request handler interacts with the file system and the same approach for changing OS behavior (as for Windows based computing system) cannot be used on Linux.

Embodiments described herein include systems and methods for saving file mappings to disk by querying the file system or by parsing a data structure that is stored in file system memory.

Embodiments described herein include systems and methods for generating a mapping structure of a format that is universal for all file systems. The mapping structure described herein allows for the identification of a particular file. The mapping structure described herein further introduces a new level of threat detection based on the detection of malicious patterns of changes in file storage structures on a disk.

Embodiments described herein include systems and methods for tracking the storage structure of files on network storages by tracking I/O operations. In contrast to other resource-heavy operations for tracking network storages, the storage structure tracking described herein is efficient due to shadow copies offloading on a network device and storing backup copy only if the data block on the storage devices corresponding to the files are changing.

The improvements described herein allow for an efficient shadow backup of mutable file data blocks on disk and provide the ability to monitor and pattern changes to disk block structures in order to prevent threats at the start of malicious operations.

In an embodiment, a method for embedding into a storage stack of a computing device, the storage stack including a file system, the computing device including a computing device data storage is provided. The method includes building a file storage map for a file stored in the computing device data storage, intercepting at least one system call associated with the file, intercepting at least one storage stack operation, and analyzing the at least one storage stack operation using the file storage map to determine a change to at least one data block of the file.

In another aspect, intercepting at least one storage stack operation comprises hooking a block layer request.

In another aspect, intercepting at least one system call comprises hooking a system call invoked by the at least one application.

In another aspect, intercepting at least one system call and intercepting at least one storage stack operation are executed in parallel.

In another aspect, the method further includes building a shadow backup on a backup data storage to create a file copy, and updating the file copy on the backup data storage corresponding to the changed at least one data block.

In another aspect, the analyzing of the method includes comparing a block structure of the file in the computing device data storage with a block structure of the file copy in the backup data storage using the file storage map.

In another aspect, the file is stored in a block structure of non-sequential blocks in the computing device data storage and the file copy is stored in a block structure of sequential blocks in the backup data storage.

In another aspect, the method further includes analyzing the at least one system call to determine whether updating the file copy on the backup data is to be performed.

In another aspect, the shadow backup includes a data block change history of the file.

In another aspect, the method further includes detecting a malicious operation based on an entropy characteristic of the data block change history.

In an embodiment, a system for embedding into a storage stack of a computing device, the storage stack including a file system, the computing device including a computing device data storage is provided. The system includes a kernel module configured communicatively coupled with the storage stack and configured to build a file storage map for a file stored in the computing device data storage, intercept at least one system call associated with the file, intercept at least one storage stack operation and analyze the at least one system call and the at least one storage stack operation using the file storage map to determine a change to at least one data block of the file.

In another aspect, intercepting at least one storage stack operation by the kernel module comprises hooking a block layer request.

In another aspect, intercepting at least one system call by the kernel module comprises hooking a system call invoked by at least one application.

In another aspect, intercepting at least one system call and intercepting at least one storage stack operation are executed in parallel by the kernel module.

In another aspect, the system further includes a backup data storage, and a backup module operably coupled with the kernel module and the backup data storage and configured to build a shadow backup on a backup data storage to create a file copy, and update the file copy on the backup data storage corresponding to the changed at least one data block.

In another aspect, the kernel module is further configured to analyze at least one system call and the at least one storage stack operation using the file storage map to determine a change to at least one data block of the file by comparing a block structure of the file in the computing device data storage with a block structure of the file copy in the backup data storage using the file storage map.

In another aspect, the file is stored in a block structure of non-sequential blocks in the computing device data storage and the file copy is stored in a block structure of sequential blocks in the backup data storage.

In another aspect, the system further includes a security application module configured to analyze the at least one system call to determine whether updating the file copy on the backup data is to be performed. For example, a security application module is configured to determine whether a copy of the file changed by a particular application needs to be created.

In another aspect, the backup module is further configured to build the shadow backup in a shadow backup data structure including a data block change history of the file.

In another aspect, the security application module is further configured to detect a malicious operation based on an entropy characteristic of the data block change history.

In a feature and advantage of embodiments, systems and methods implement a universal shadow backup. Embodiments can operate universally on data blocks on disk volumes with different file systems, under different operating systems, and/or different versions of operating systems. Using a parallel input/output and read/write request handler that interacts with the file system, embodiments can receive data in a shadow copy mode and save a storage structure of data blocks for files in a universal format.

In another feature and advantage of embodiments, systems and methods provide an efficient shadow backup with minimal impact on the resources of the protected computer. For example, as described herein, embedding with operating system blocks operating in parallel efficiently saves file mappings to disk. Further, a universal mapping structure can be utilized to easily determine changes in file storage structures.

In another feature and advantage of embodiments, systems and methods can utilize a shadow copy to identify a file that has been moved to another drive, volume, or network drive. Accordingly, support for network or cloud drive backups is improved over existing technologies.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Figure 1:
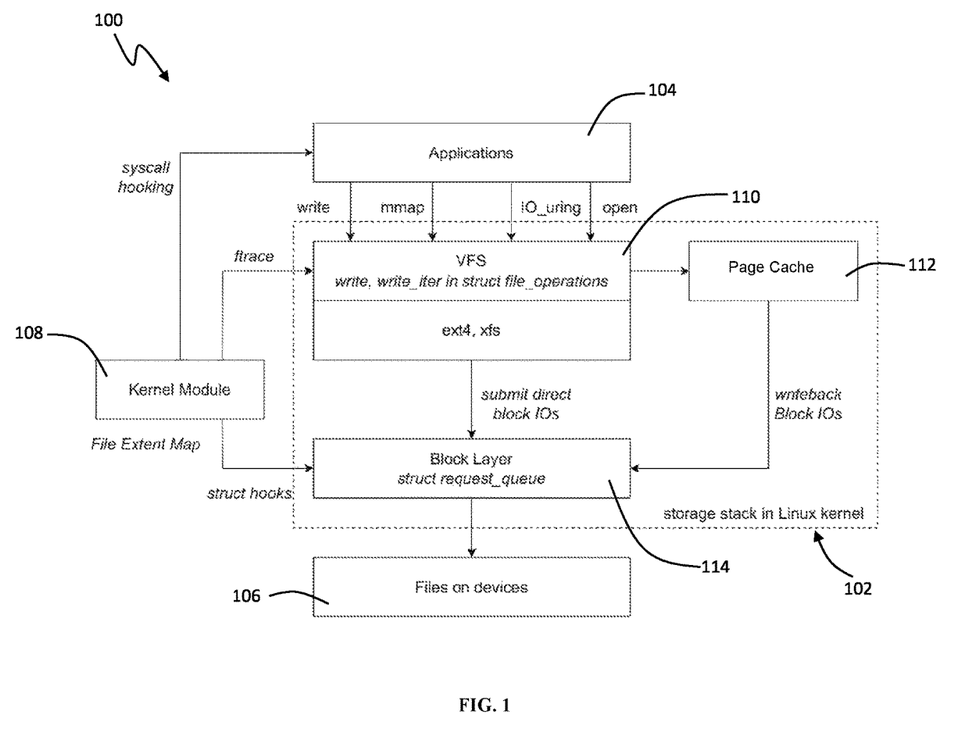
FIG. 1 is a block diagram of a system for embedding into a LINUX data storage stack, according to an embodiment.

Referring to FIG. 1, a block diagram of a system 100 for embedding into a LINUX data storage stack is depicted, according to an embodiment. As used herein, LINUX or UNIX refer to the family of UNIX-like operating systems. System 100 generally comprises a storage stack 102, one or more applications 104, a files data storage 106, and a kernel module 108.

The system can include various engines or modules, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Storage stack 102 is depicted in FIG. 1 as a LINUX kernel storage stack. However, one of skill in the art will appreciate that the concepts described herein can be readily utilized on other types of storage stacks. Storage stack 102 generally comprises a virtual file system layer (VFS) 110, a page cache 112, and a block layer 114.

VFS 110 is a software layer that handles all system calls related to a filesystem. As illustrated, in embodiments, VFS 110 is a software layer that provides the filesystem interface to userspace programs (applications 104).

More particularly, VFS 110 is utilized to support different types of file systems. In embodiments, VFS 110 generally comprises a set of objects and callbacks which are implemented by any file system. VFS 110 is called by system 100 calls coming from user space (e.g. applications 104) into a specific implementation of the current file system. The implementation of the I/O operation manipulates VFS objects and interacts with block layer 114 to read and write persistent data.

Page cache 112 is used to cache the pages of files on the disk. In embodiments, page cache 112 is the main disk cache used by the LINUX kernel. In most cases, the kernel refers to page cache 112 when reading from or writing to disk. In most cases, all read( ) and write( ) file operations rely on page cache 112.

New pages are added to page cache 112 to satisfy user mode read requests. If the page is not already in page cache 112, a new entry is added to page cache 112 and filled with the data read from the disk. If there is enough free memory, the page is kept in page cache 112 for an indefinite period of time and can then be reused by other processes without accessing the disk.

Block layer 114 implements the interface that applications and file systems use to access various storage devices. Block layer 114 implements request queues with buffer I/O, a pointer to the request queue of the files data storage 106. Accordingly, requests placed on request queues are handled by block layer 114 as a persistent storage controller to files data storage 106.

One or more applications 104 are user applications that can operate on system 100. In embodiments, one or more applications 104 can invoke system calls. When a system call is invoked (e.g. write, mmap, IO_uring, open as depicted in FIG. 1), system 100 switches to kernel mode and starts the execution of a kernel function.

Files data storage 106 comprises a persistent storage repository. In embodiments, files corresponding to system 100 and particularly, user files can be stored in data storage 208. In an embodiment, data storage 106 comprises an accessible storage area of a storage device such as a fixed disk, floppy disk, CD-ROM, or other storage that is formatted to store directories and files.

Kernel module 108 is embedded into storage stack 102 and configured to intercept file operations of applications, build a file storage map on physical media, and track changes to file data blocks on disk. Kernel module 108 can be implemented as an engine integrated into the LINUX kernel.

Kernel module 108 is configured to implement a plurality of hooks. A hooking technique or "hook", as used interchangeably herein, can include functions to alter or augment the behavior of an operating system, of applications, or of other software components by intercepting function calls or messages or events passed between software components. A hook is code that handles such intercepted function calls, events, or messages.

In an embodiment, kernel module 108 can operate on different levels of system 100. Kernel module 108 can utilize syscall hooking into application write, mmap, io_uring, and/or open calls, for example. In an embodiment, when kernel module 108 hooks applications 104, kernel module 108 can determine which application 104 may be suspicious. Embodiments can also determine file operations based on application 104 data.

Kernel module 108 can also hook at VFS 110. For example, kernel module 108 can utilize ftrace and struct hooks to hook into write, write_iter in struct file_operations calls.

Kernel module 108 can also hook at block layer 114. For example, kernel module 108 can utilize ftrace and struct hooks to hook into request_queue operations. When kernel module 108 hooks block layer 114, kernel module 108 can determine the structure of blocks on files data storage 106.

In embodiments, kernel module 108 can hook simultaneously, in parallel, or otherwise concurrently hook multiple application 104 calls, VFS 110 operations, and/or block layer 114 operations.

Kernel module 108 can further build a file storage map (e.g. File Extent Map) on by querying the file system or by parsing a data structure that is stored in file system memory. In an embodiment, using the file storage map, kernel module 108 can further track changes to file data blocks on disk.

System 100 can also support a "clone copy" or "shadow copy" mode. In embodiments, kernel module 108 requests the operating system to create a copy of the file to track changes. In this case there can also be an additional detection layer, such as a block structure of the target current file version being compared with cloned original block structure.

Kernel module 108 can also utilize hooks into block layer 114 to analyze data block and block structure for entropy. For example, if the entropy of blocks is higher than typical or according to a pattern or threshold, then it is likely that ransomware is encrypting the file. As described herein, the set of hooked system calls and file blocks changes can define the pattern of a threat. Accordingly, data from various hooked levels of system 100 can be used to detect a threat.

Figure 2:
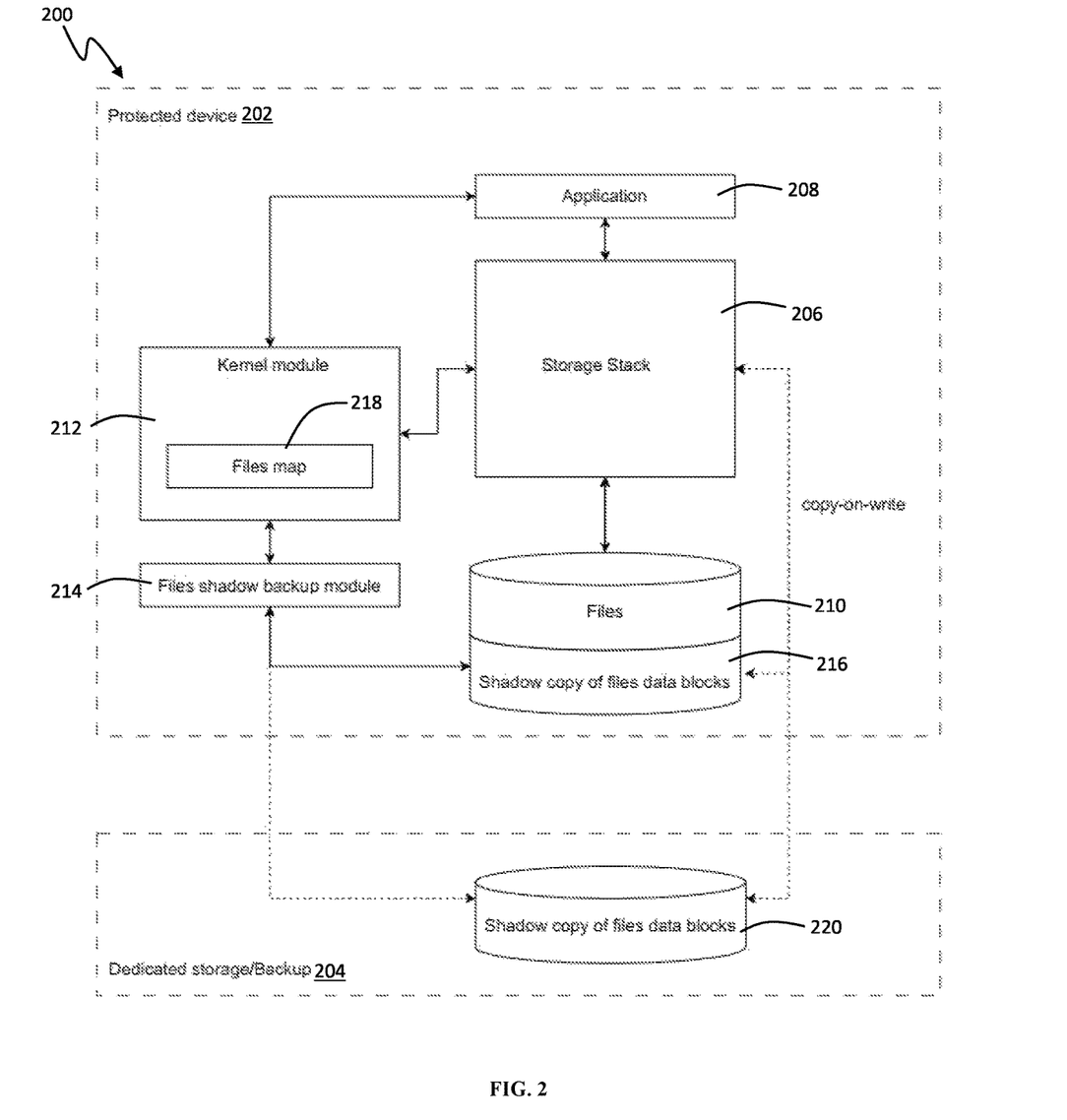
FIG. 2 is a block diagram of a system for creating a shadow copy, according to an embodiment.

Referring to FIG. 2, a block diagram of a system 200 for creating a shadow copy is depicted, according to an embodiment. System 200 can create data backups using a shadow copy. System 200 has certain elements in common or corresponding to system 100 and those elements are not redescribed herein for ease of explanation.

System 200 generally comprises a protected device 202 and a dedicated storage 204. Protected device 202 comprises a device protected by the systems and methods described herein. For example, protected device 202 can be backed up with a shadow backup. In other embodiments, protected device 202 can be protected from malicious operations using a shadow backup as described herein.

Protected device 202 generally comprises a storage stack 206, one or more applications 208, a files data storage 210, a kernel module 212, a shadow backup module 214, and a shadow copy In an embodiment, storage stack 206 is substantially similar to storage stack 102, files data storage 210 is substantially similar to files data storage 106, and one or more applications 208 is substantially similar to one or more applications 104.

Kernel module 212 is substantially similar to kernel module 108, and further comprises shadow copy capabilities as described herein. For example, kernel module 212 comprises a files map 218. Kernel module 212 can build files map 218 as its own copy of the mappings of files data storage 106 by querying the file system or by parsing a data structure that is stored in file system memory. Kernel module 212 is further configured to detect changed file data blocks using files map 218 and instruct changed data blocks to be copied to dedicated storage.

In an embodiment, the mapping structure of files map 218 is a universal format for all file systems. Embodiments described herein utilize the universal format to identify a file or introduce a level of threat detection based on the detection of malicious patterns of changes in file storage structures on a disk.

Backup module 214 is configured to create one or more shadow copies of one or more files in files data storage 216. Accordingly, backup module 214 is communicatively coupled with kernel module 212 and backup data storage such as shadow copy storage 216. In embodiments, backup module 214 is further communicatively coupled with dedicated storage 204.

Shadow copy storage 216 comprises a persistent storage repository. In an embodiment, data storage 216 comprises an accessible storage area of a storage device such as a fixed disk, floppy disk, CD-ROM, or other storage that is formatted to store directories and files. As illustrated in FIG. 2, shadow copy storage 216 can be within or adjacent the same storage as files Dedicated storage 204 comprises a persistent storage repository. As depicted in FIG. 2, dedicated storage 204 can also be called backup 204. Dedicated storage 204 comprises a repository 220 of a shadow copy of files data blocks. Dedicated storage 204 can be a folder, directory, and/or physical disk on a protected device or remote storage (network storage, cloud storage etc.). As illustrated, in order to communicate backup or shadow instructions, backup module 214 is operably coupled to repository 220.

In system 200 operation, kernel module 212 can intercept one or more calls or operations from storage stack 206 and/or applications 208. Kernel module 212 utilizes files map 218 to detect changed file data blocks based on the intercepted calls or operations. If a file data block is determined to be changed, kernel module 212 copies the changed blocks to dedicated storage by instruction to backup module 214. Backup module 214 accordingly commands a shadow copy be created in shadow copy storage 216 on protected device 202, and/or repository 220 of dedicated storage 204.

Figure 3:
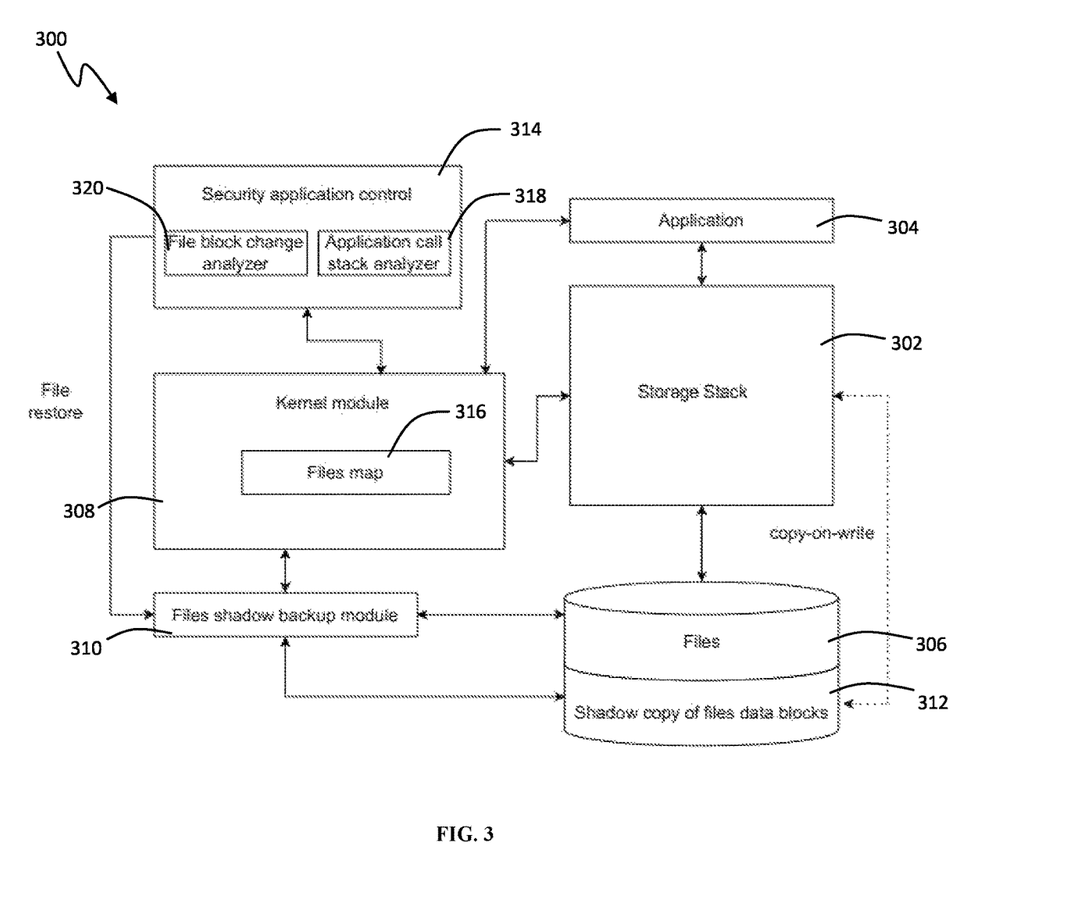
FIG. 3 is a block diagram of another system for creating a shadow copy, according to an embodiment.

Referring to FIG. 3, a block diagram of another system 300 for creating a shadow copy is depicted, according to an embodiment. System 300 generally comprises a storage stack 302, one or more applications 304, a files data storage 306, a kernel module 308, a backup module 310, a shadow copy storage 312, and a security application module 314. System 300 has certain elements in common or corresponding to system 100 and 200 and those elements are not redescribed herein for ease of explanation.

For example, in system 300 operation, kernel module 308 can intercept one or more calls or operations from storage stack 302 and/or applications 304. Kernel module 308 utilizes files map 316 to detect changed file data blocks based on the intercepted calls or operations. If a file data block is determined to be changed, kernel module 308 copies the changed blocks to dedicated storage by instruction to backup module 310. Backup module 310 accordingly commands a shadow copy be created in shadow copy storage 312.

Security application module 314 is configured to determine when one or more files are to be backed up based on application system calls and instruct such backup. Accordingly, as illustrated, security application module 314 is communicatively coupled to kernel module 308 and backup module 310.

In an embodiment, security application module 314 comprises an application call stack analyzer 318 and a file block change analyzer 318.

Application call stack analyzer 318 is configured to analyze system calls (filters system calls, uses a machine learning model, detects behavior patterns, calculates application security rank based on syscalls and application parameters like certificates, signatures, or other methods) and determine that files accessed by an application 304 are to be backed up.

File block change analyzer 320 is configured to optimize storage usage. Accordingly, in an embodiment, file block change analyzer 320 is configured to instruct backup instructions to backup module 310 to store file data blocks (when they are being changed) and skips read operations or file system-level operations.

In an embodiment, file block change analyzer 320 is further configured to analyze the entropy of data blocks and classify data blocks as malicious. In embodiments, entropy data can further be utilized as an additional parameter for classifying applications as malicious or safe.

Referring to FIGS. 4-7, block diagrams of a system 400 implementing a shadow copy are depicted, according to an embodiment. In particular, FIGS. 4-7 sequentially depict a shadow copy operation. Though different operations will be described with respect to FIGS. 4-7, each system generally comprises a file system 402, a storage device 404, and a dedicated storage (backup) 406 with respect to File A.

Figure 4:
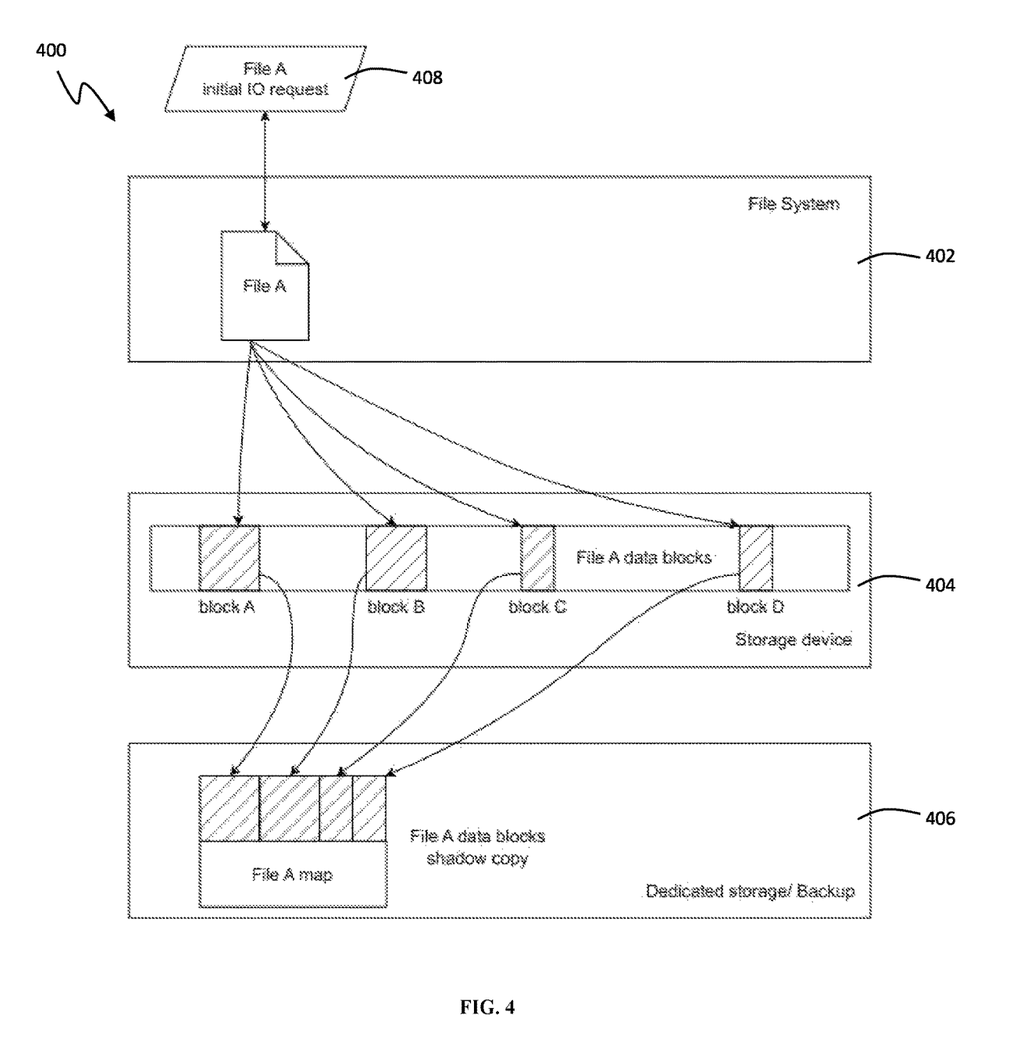
FIGS. 4-7 are block diagrams of a system implementing a shadow copy, according to an embodiment.

Referring to FIG. 4, when system 400 is started on a protected device, and upon an initial I/O request 408, embodiments read File A data blocks on storage device 404 and create a shadow copy on dedicated storage 406 if File A data blocks are accessed by a suspicious application. For example, blocks A-D on storage device 404 are re-created on dedicated storage 406. Notably, in an embodiment, while blocks A-D are not stored next to each other on storage device 404, blocks A-D are created next to each other on File A map dedicated storage 406. In other embodiments, blocks A-D are not stored next to each other.

Figure 5:
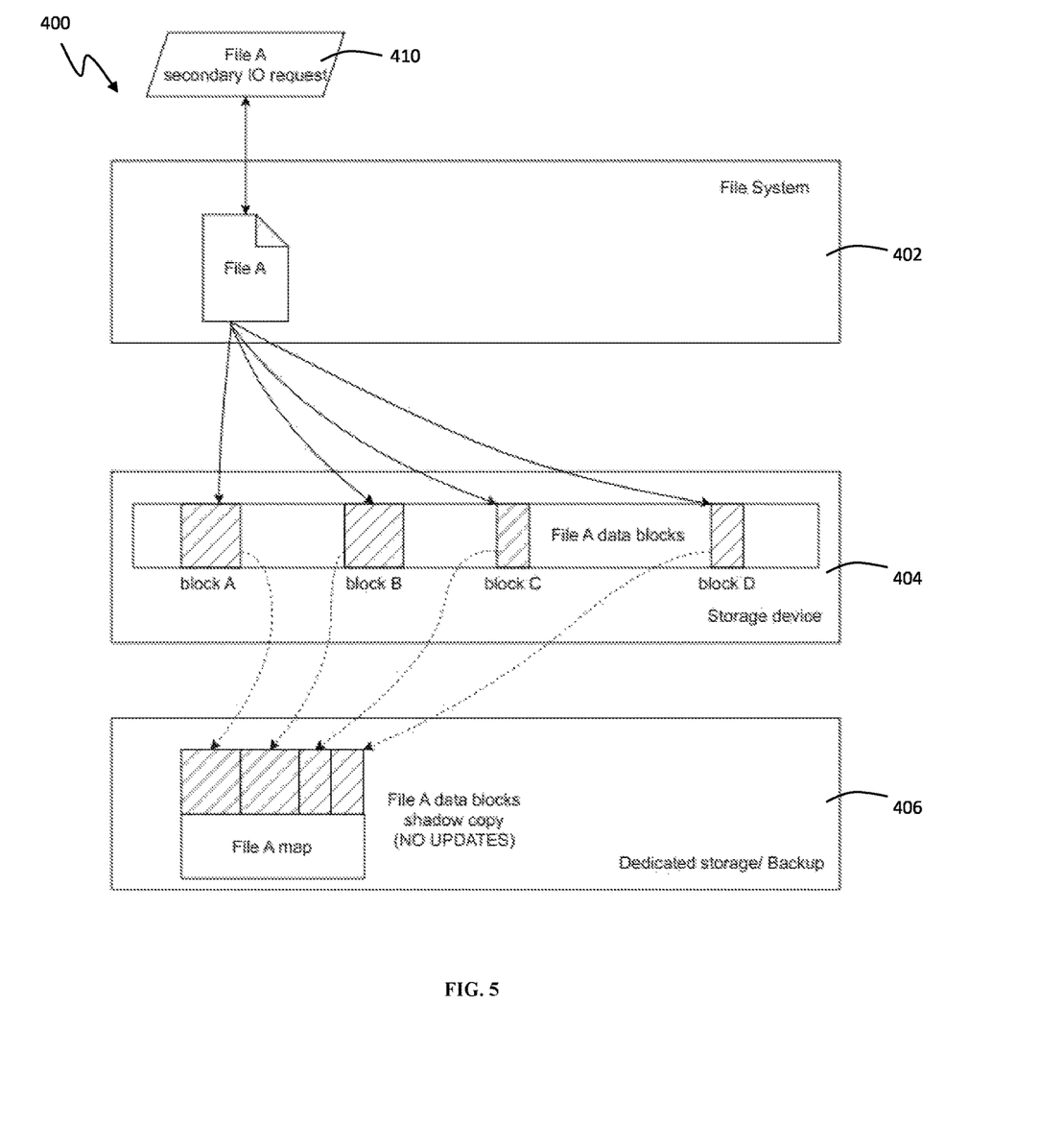

Referring to FIG. 5, in the example of an I/O request 410 that does not change the content of File A data blocks, the shadow copy does not update at dedicated storage 406.

Figure 6:
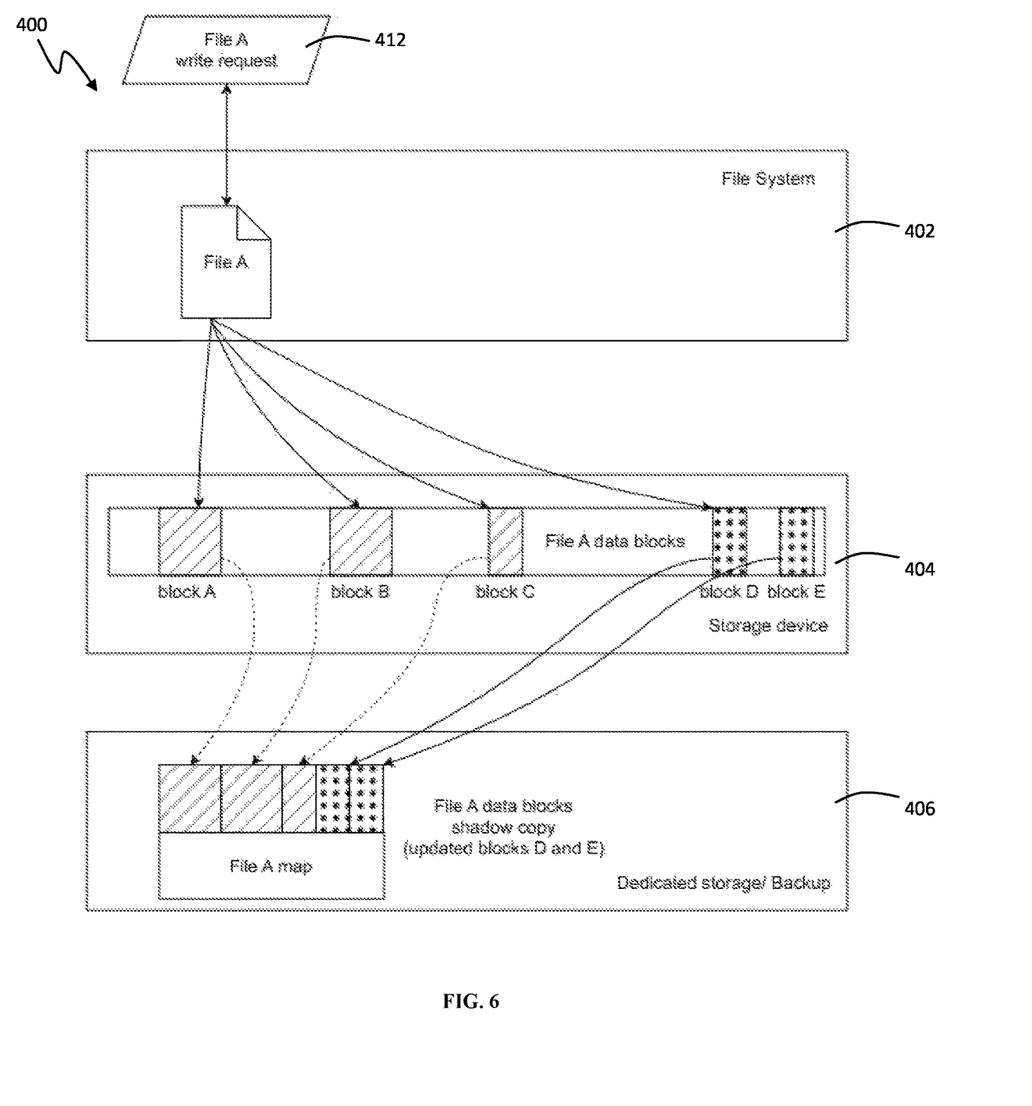

Referring to FIG. 6, in the example of an I/O request 412 that does change the content of File A data blocks (for example by write request), then shadow copy is updated with new or changed data blocks). In particular, block D is updated and block E is added to File A on storage device 404. Correspondingly, block D is updated on dedicated storage 406 and block E is added next to block E on dedicated storage 406.

Figure 7:
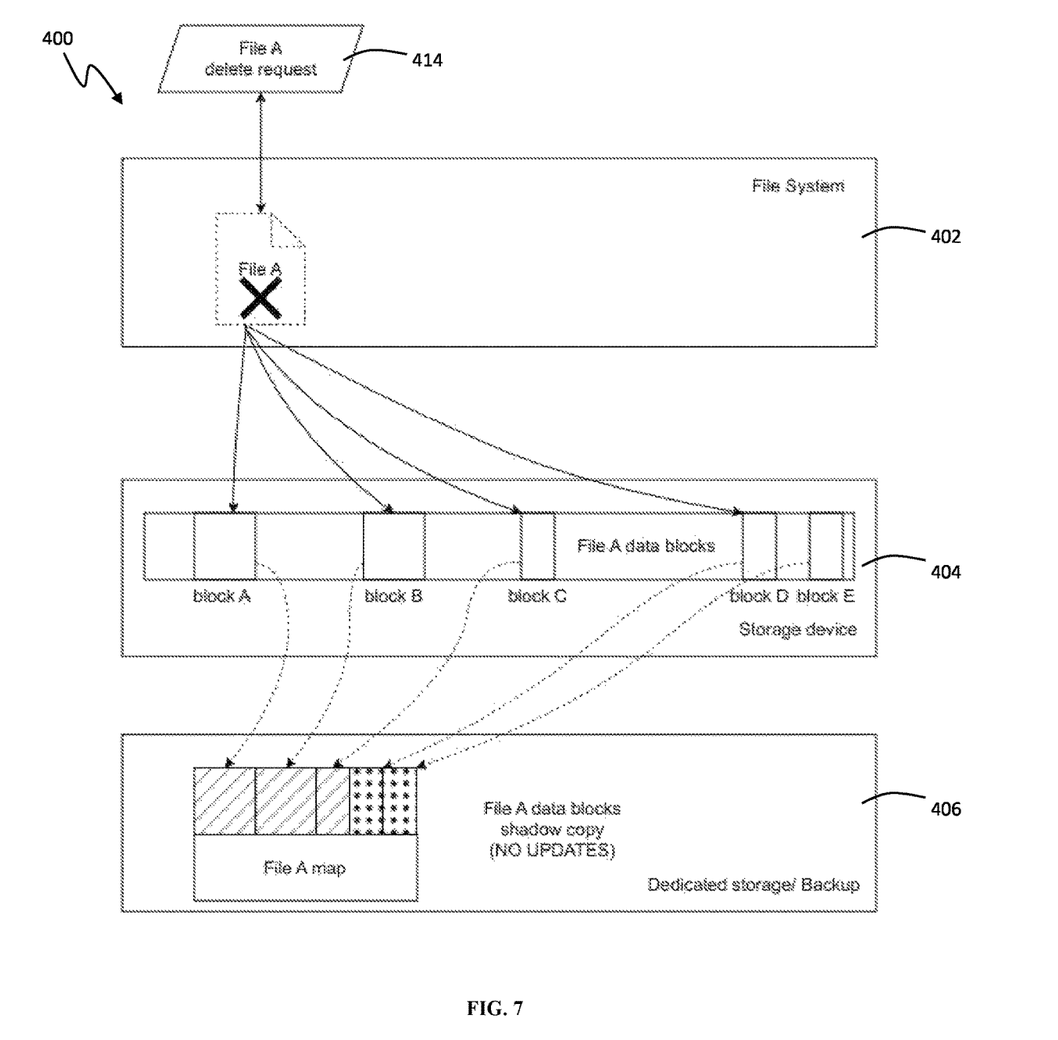

Referring to FIG. 7, in the example of an I/O request 414 that deletes File A at the file system 402 level, the data blocks corresponding to File A (blocks A-E) are indicated as freed on storage device 404. However, the data blocks corresponding to File A (blocks A-E) on dedicated storage 406 does not update. In other words, the data blocks corresponding to File A remain on dedicated storage 406 such that the shadow copy is not updated.

In an embodiment, if blocks A-E are further modified by another process of file operation at file system 402, thereby overwriting some of these blocks, then these blocks are written to the shadow copy at dedicated storage 406 before they are modified. In this embodiment, system 400 does not make an unneeded backup for each file operation, and stores a backup copy only if file data blocks are going to be changed by suspicious operation or by another process or file.

In an embodiment, a shadow copy structure can be file-centric such that backup operations are handled at the file level (e.g. entire files are added, deleted, or written).

Figure 8:
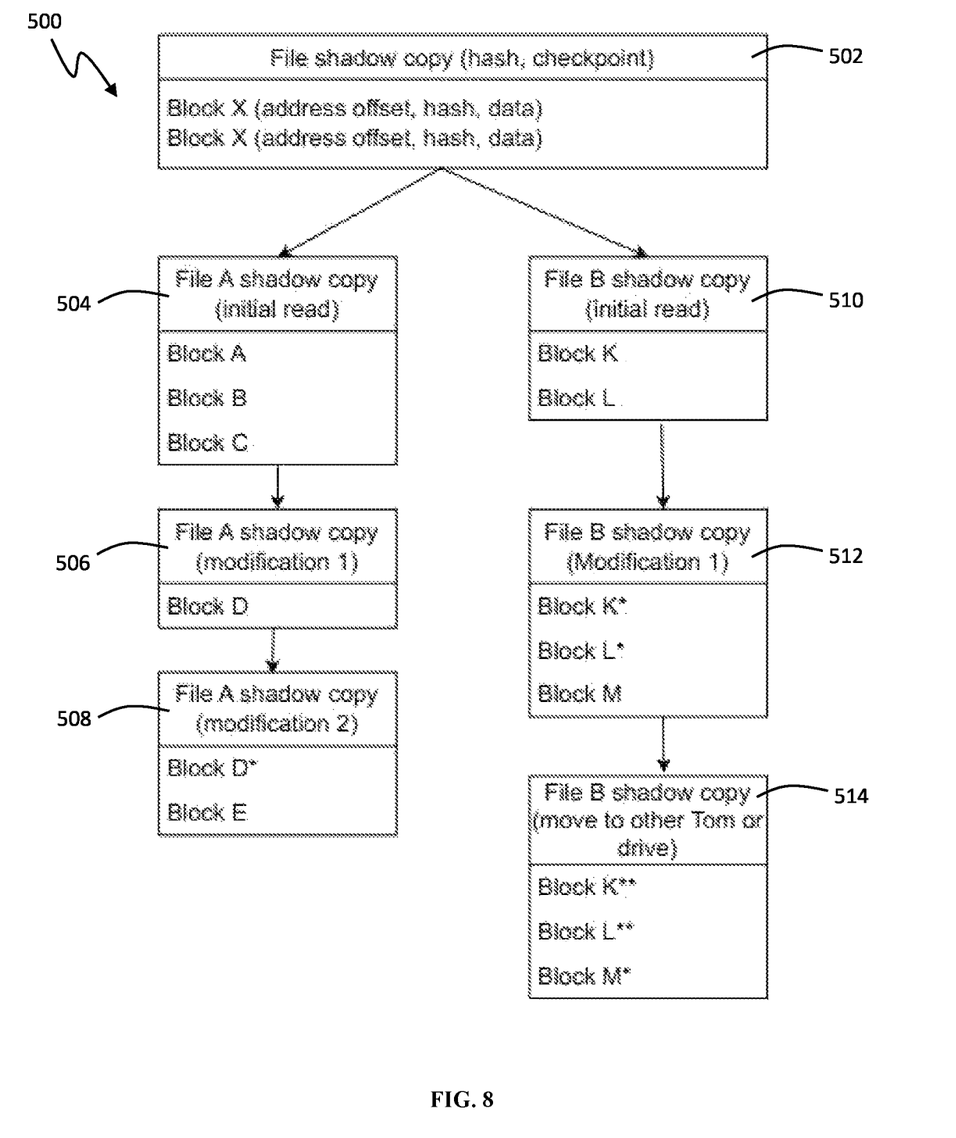
FIG. 8 is a block diagram of a shadow copy structure, according to an embodiment.

In another embodiment, referring to FIG. 8, a block diagram of a data block-centric shadow copy structure 500 is depicted, according to an embodiment. In the example depicted, shadow copy structure 500 allows for storing of chronological changes to file data blocks on disk corresponding to certain checkpoints, such as file modifications or file operations by certain processes or applications. In this embodiment, for each block, the block content as well as the physical address or address offset, hash sum, or other identifier of the data block can be stored. The combination of data blocks and metadata for each block allows for the identification of a file when it is copied to another disk, volume, or file system, thereby not creating a new backup copy and keeping an earlier version of the file. Otherwise, without this functionality, when a file is transferred to another disk, the file volume and file system will be considered "new" by the system and a new copy will be created for the erroneously-determined "new" file.

The data block change history (as shown in FIG. 8) can be used in threat detection. In an embodiment, with the change to a given block, the entropy of each block can be classified as malicious or used as an additional argument in the system for classifying applications as malicious or safe. This structure is also universal for different file systems, which allows it to be used on various devices with all of the functionality described and depicted herein, including backup and recovery, threat detection, etc.

For example, as illustrated in FIG. 8, a file shadow copy operation 502 is conducted on File A and File B. Referring first to File A, at 504 an initial read of Block A, Block B, and Block C is conducted. At 506, a first modification of File A is made. For example, Block D is added. At 508, a second modification of File A is made. Block D is modified (notated in FIG. 8 by the asterisk *), and Block E is added. Accordingly, the relative entropy of Block D with its two modifications is higher than Block E and its one modification.

Referring next to File B, at 510 an initial read of Block K and Block L is conducted. At 512, a first modification of File B is made. Block K is modified, Block L is modified, and Block M is added. Accordingly, Blocks K and L are notated with the single asterisk *. At 514, a move of File B to a different drive is conducted. Accordingly, Block K, Block L, and Block M are again modified (notated with the additional asterisk **).

Figure 9:
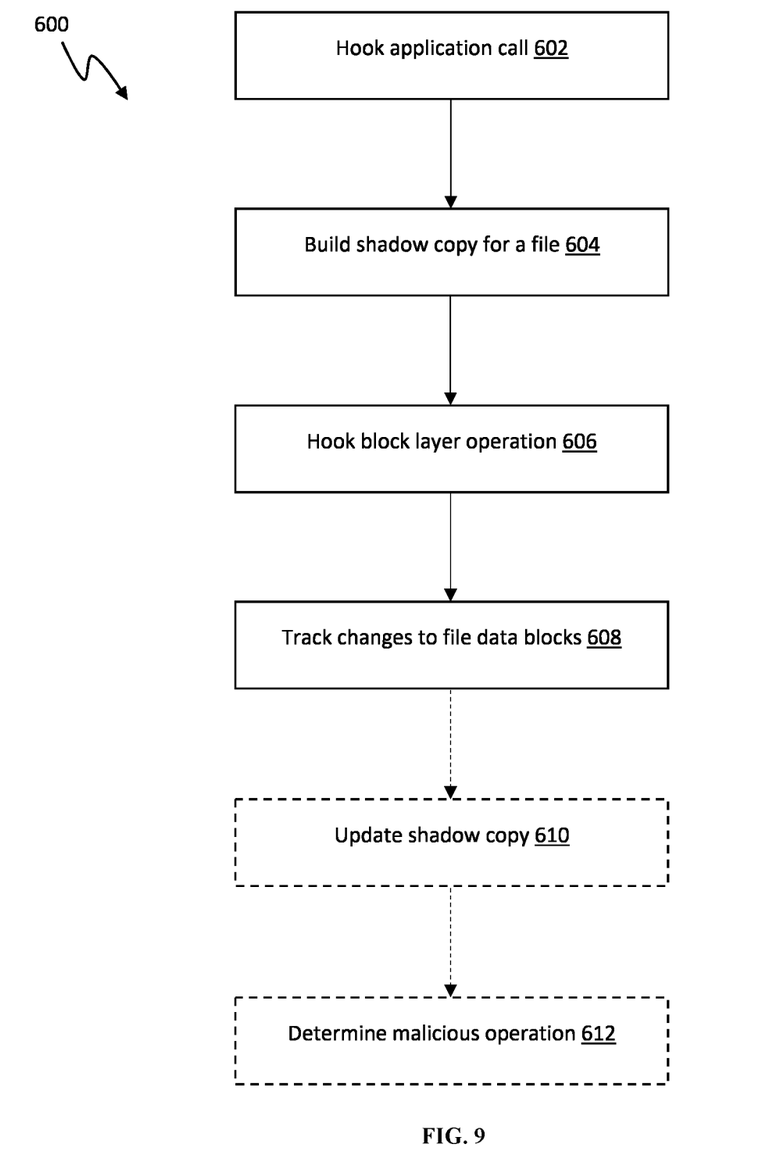
FIG. 9 is a flowchart of a method for embedding into a storage stack, according to an embodiment.

Referring to FIG. 9, a flowchart of a method 600 for embedding into a storage stack is depicted, according to an embodiment. In embodiments, method 600 can be implemented by any of the components described herein, including systems 100, 200, 300, and/or 400 and the data structure of shadow copy structure 500. For ease of explanation, reference is made to system 300 and shadow copy structure 500.

At 602, method 600 further comprises hooking a system call. For example, kernel module 308 can hook one or more calls from application 304 to storage stack 302. In embodiments, kernel module 308 and/or security application module 314 can analyze the hooked system call.

At 604, method 600 comprises building a shadow copy for a file from a computing device file system. For example, kernel module 308 is configured to read data for the file from the file system of storage stack 302. In coordination with backup module 310, a copy of the file is created as a shadow copy in shadow copy storage 312. In embodiments, the shadow copy of the file is created in the structure of shadow copy structure 500.

At 606, method 600 further comprises hooking a block layer operation. For example, kernel module 308 can hook one or more block layer operations within storage stack 302. In embodiments, the hook into the block layer is via the request queue to access blocks of file content. In embodiments, kernel module 308 and/or security application module 314 can analyze the hooked system call.

At 608, method 600 further comprises tracking changes to file data blocks. For example, kernel module 308 can utilize files map 316 to detect changed file data blocks based on the intercepted calls or operations at 604 and/or 606.

Optionally, at 610, based on the tracked changes at 608, the shadow copy is updated. For example, if kernel module 308 determines a file data block to be changed, kernel module 308 copies the changed blocks to dedicated storage 312 by instruction to backup module 310. Backup module 310 accordingly commands a shadow copy be created in shadow copy storage 312. In embodiments, using the shadow copy structure 500, the data block change history of the file is stored.

Optionally, at 612, malicious operations can be determined based on the tracked changes at 608. For example, security application module 314 can utilize the data block change history of the file as included in shadow copy structure 500 to detect a malicious operation based on an entropy characteristic of the data block change history.

The invention claimed is:

1. A method for embedding into a storage stack of a computing device, the storage stack including a file system, the computing device including a computing device data storage, the method comprising:
   intercepting at least one system call associated with a file;
   building a file storage map for the file stored in the computing device data storage;
   intercepting at least one storage stack operation;
   building a shadow backup on a backup data storage to create a file copy, the file copy created only when the intercepted at least one system call or the intercepted at least one storage stack operation accesses the file;
   analyzing the at least one system call and the at least one storage stack operation using the file storage map to determine a change to at least one data block of the file;
   updating the file copy on the backup data storage corresponding to the changed at least one data block only when the at least one data block of the file is changing.

2. The method of claim 1, wherein intercepting the at least one storage stack operation comprises hooking a block layer request.

3. The method of claim 1, wherein intercepting the at least one system call comprises hooking a system call invoked by the at least one application.

4. The method of claim 1, wherein intercepting the at least one system call and intercepting at least one storage stack operation are executed in parallel.

5. The method of claim 1, wherein the analyzing includes comparing a block structure of the file in the computing device data storage with a block structure of the file copy in the backup data storage using the file storage map.

6. The method of claim 1, wherein the file is stored in a block structure of non-sequential blocks in the computing device data storage and the file copy is stored in a block structure of sequential blocks in the backup data storage.

7. The method of claim 1, further comprising:
analyzing the at least one system call to determine whether updating the file copy on the backup data is to be performed.

8. The method of claim 1, wherein the shadow backup comprises a data structure including a data block change history of the file, wherein the data block change history comprises a plurality of blocks, each block corresponding to a chronological representation of the file and metadata corresponding to an entropy characteristic for a given chronological representation.

9. The method of claim 8, further comprising:
detecting a malicious operation based on the entropy characteristic of the data block change history.

10. The method of claim 9, wherein the entropy characteristic is a count associated with the number of changes to the file for the given chronological representation.

11. A system for embedding into a storage stack of a computing device, the storage stack including a file system, the computing device including a computing device data storage, the system comprising:
a kernel module configured communicatively coupled with the storage stack and configured to:
intercept at least one system call associated with the file,
build a file storage map for a file stored in the computing device data storage,
intercept at least one storage stack operation, and
analyze the at least one system call and the at least one storage stack operation using the file storage map to determine a change to at least one data block of the file;
a backup data storage; and
a backup module operably coupled with the kernel module and the backup data storage and configured to:
build a shadow backup on a backup data storage to create a file copy, the file copy created only when the intercepted at least one system call or the intercepted at least one storage stack operation accesses the file, and
update the file copy on the backup data storage corresponding to the changed at least one data block only when the at least one data block of the file is changing.

12. The system of claim 9, wherein intercepting at least one storage stack operation comprises hooking a block layer request.

13. The system of claim 9, wherein intercepting at least one system call comprises hooking a system call invoked by the at least one application.

14. The system of claim 9, wherein intercepting the at least one system call and intercepting at least one storage stack operation are executed in parallel.

15. The system of claim 9, wherein the kernel module is further configured to analyze the at least one system call and the at least one storage stack operation using the file storage map to determine a change to at least one data block of the file by comparing a block structure of the file in the computing device data storage with a block structure of the file copy in the backup data storage using the file storage map.

16. The system of claim 9, wherein the file is stored in a block structure of non-sequential blocks in the computing device data storage and the file copy is stored in a block structure of sequential blocks in the backup data storage.

17. The system of claim 9, further comprising:
a security application module configured to analyze the at least one system call to determine whether updating the file copy on the backup data is to be performed.

18. The system of claim 9, wherein the backup module is further configured to build the shadow backup in a shadow backup data structure including a data block change history of the file, wherein the data block change history comprises a plurality of blocks, each block corresponding to a chronological representation of the file and metadata corresponding to an entropy characteristic for a given chronological representation.

19. The system of claim 18, further comprising:
a security application module configured to detect a malicious operation based on the entropy characteristic of the data block change history.

20. The system of claim 19, wherein the entropy characteristic is a count associated with the number of changes to the file for the given chronological representation.

\* \* \* \* \*